US012178379B2

(12) United States Patent
Aguiar, Jr.

(10) Patent No.: US 12,178,379 B2
(45) Date of Patent: Dec. 31, 2024

(54) DISHWASHING APPLIANCES AND SENSOR ASSEMBLIES FOR DETECTING A POSITION OF AN APPLIANCE DOOR

(71) Applicant: Haier US Appliance Solutions, Inc., Wilmington, DE (US)

(72) Inventor: Ricardo Alberto Aguiar, Jr., Clarksville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 381 days.

(21) Appl. No.: 17/715,271

(22) Filed: Apr. 7, 2022

(65) Prior Publication Data

US 2023/0320558 A1     Oct. 12, 2023

(51) Int. Cl.
   *A47L 15/42*        (2006.01)
   *A47L 15/46*        (2006.01)
   *G01B 11/26*        (2006.01)
   *G01B 17/00*        (2006.01)

(52) U.S. Cl.
CPC ....... *A47L 15/4259* (2013.01); *A47L 15/4274* (2013.01); *A47L 15/4293* (2013.01); *A47L 15/46* (2013.01); *G01B 11/26* (2013.01); *G01B 17/00* (2013.01); *A47L 2401/26* (2013.01); *A47L 2401/30* (2013.01); *A47L 2501/22* (2013.01)

(58) Field of Classification Search
CPC ..... G01B 11/26; G01B 17/00; A47L 15/4274; A47L 15/4293; A47L 15/4259; A47L 15/46; A47L 2401/26; A47L 2501/22; A47L 2401/30

See application file for complete search history.

(56) References Cited

U.S. PATENT DOCUMENTS 9,378,630 B2    6/2016   Smith
10,470,640 B2 *   11/2019   Ryu .................... A47L 15/0049
10,963,078 B2    3/2021   Lee et al.
(Continued)

FOREIGN PATENT DOCUMENTS

BE           1030230 A1 *   8/2023
CN       108618730 A    *   10/2018          A47L 15/4257
(Continued)

OTHER PUBLICATIONS

Machine translation of BE 1030230 A1 to Carsten. (Year: 2023).*
(Continued)

*Primary Examiner* — Benjamin L Osterhout
(74) *Attorney, Agent, or Firm* — Dority & Manning, P.A.

(57) ABSTRACT

A dishwashing appliance may include a cabinet, a door, and a sensor assembly. The cabinet may extend along a lateral direction between a first side and a second side. The cabinet may define a wash chamber for receipt of articles for washing. The door may extend along a vertical direction between a top end and a bottom end. The door may be rotatably mounted to the cabinet to move along a rotation path between an opened position and a closed position. The sensor assembly may be attached to the cabinet to detect a positional angle of the door. The sensor assembly may include a wave emission sensor directed at the rotation path to project an emitted wave and a wave reception sensor spaced apart from the wave emission sensor to receive a reflection of the emitted wave.

20 Claims, 5 Drawing Sheets

(56) References Cited

U.S. PATENT DOCUMENTS

2014/0015814 A1     1/2014   Santana et al.
2018/0306395 A1 *  10/2018   Conrad .................. F21K 9/232
2021/0113051 A1 *   4/2021   Hodapp, Jr. ........ A47L 15/4259

FOREIGN PATENT DOCUMENTS

| DE | 102016101807 | A1 |   | 8/2016  |             |
|----|--------------|----|---|---------|-------------|
| DE | 102017221258 | A1 | * | 5/2019  |             |
| TR | 201714101    | A2 | * | 4/2019  |             |
| WO | WO2006101786 | A2 |   | 9/2006  |             |
| WO | WO2019105832 | A1 |   | 6/2019  |             |
| WO | WO-2019242196| A1 | * | 12/2019 | ......... A47L 15/4257 |
| WO | WO-2021111655| A1 | * | 6/2021  |             |

OTHER PUBLICATIONS

Machine translation of CN-108618730-A to Dan. (Year: 2018).*
Machine translation of DE-102017221258-A1 to Heidel. (Year: 2019).*
Machine translation of TR 201714101 A2 to Mehmet et al. (Year: 2019).*
Machine translation of WO-2019242196-A1 to Dan. (Year: 2019).*
Machine translation of WO-2021111655-A1 to Arata. (Year: 2021).*

\* cited by examiner

DISHWASHING APPLIANCES AND SENSOR ASSEMBLIES FOR DETECTING A POSITION OF AN APPLIANCE DOOR

FIELD OF THE INVENTION

The present subject matter relates generally to a dishwashing appliance or sensor assembly for detecting a position of a door.

BACKGROUND OF THE INVENTION

Dishwashing appliances or dishwashers generally include a cabinet or tub that defines a wash chamber for receipt of articles for washing. A door mounted to the cabinet provides selective access to the washing chamber. The door is normally mounted to the cabinet using hinges that allow the door to rotate between an open configuration and a closed configuration. Certain dishwashing appliances also include a rack assembly slidably mounted within the wash chamber. A user can load articles, such as plates, bowls, glasses, or cups, into the rack assembly, and the rack assembly can support such articles within the wash chamber during operation of the dishwashing appliance. Spray assemblies within the wash chamber can apply or direct wash fluid towards articles disposed within the rack assemblies in order to clean such articles. Multiple spray assemblies can be provided, including, for example, a lower spray arm assembly mounted to the tub at a bottom of the wash chamber; a mid-level spray arm assembly mounted to one of the rack assemblies; or an upper spray assembly mounted to the tub at a top of the wash chamber. Other configurations may be used as well.

Some existing appliances include a door lock and feature for detecting the door is in a closed position, such as to ensure recirculation pump is stopped in a dishwashing appliance if the door is no longer closed. In such appliances, a reed switch is often used to detect when the door is fully closed.

Although it may be useful to detect when a door is in a closed position, these existing appliances present a number of drawbacks. Specifically, these approaches may be unable to detect other positions of the door (e.g., positions that are not fully closed). Attempts have been made to address some of these issues, such as by mounting Hall effect sensors, gyroscopes, or accelerometers on the door. However, such arrangements can be expensive and generally increase the cost and complexity of the appliance. This, in turn, may make assembly, maintenance, or operation of the appliance more difficult (e.g., expensive, demanding, or less reliable).

Separate from or in addition to detecting the door position, users may experience confusion or frustration if a control panel or user interface is inadvertently engaged, such as by a user's leg, stomach, etc. accidentally touching the control panel. Such engagement may change various settings, such as to delay activation of the dishwasher or alter the wash cycle.

As a result, dishwashing appliances or assemblies addressing one or more of the above issues would be useful. In particular, it would be advantageous to provide a dishwashing appliance or assembly capable of detecting a position that is other than the fully closed position (e.g., without requiring a Hall effect sensor, gyroscope, or accelerometer on the door). Additionally or alternatively, it would be useful to provide a dishwashing appliance or assembly capable of preventing inadvertent inputs or engagement with the control panel.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a dishwashing appliance is provided. The dishwashing appliance may include a cabinet, a door, and a sensor assembly. The cabinet may extend along a lateral direction between a first side and a second side. The cabinet may define a wash chamber for receipt of articles for washing. The door may extend along a vertical direction between a top end and a bottom end. The door may be rotatably mounted to the cabinet to move along a rotation path between an opened position and a closed position. The sensor assembly may be attached to the cabinet to detect a positional angle of the door. The sensor assembly may include a wave emission sensor directed at the rotation path to project an emitted wave and a wave reception sensor spaced apart from the wave emission sensor to receive a reflection of the emitted wave.

In another exemplary aspect of the present disclosure, a dishwashing appliance is provided. The dishwashing appliance may include a cabinet, a door, and a sensor assembly. The cabinet may extend along a lateral direction between a first side and a second side. The cabinet may define a wash chamber for receipt of articles for washing. The door may extend along a vertical direction between a top end and a bottom end. The door may be rotatably mounted to the cabinet to move between an opened position and a closed position. The sensor assembly may be attached to the cabinet to detect a rotational position of the door. The sensor assembly may include a wave emission sensor mounted to the door at the bottom end to project an emitted wave therefrom and a wave reception sensor mounted to the door at the bottom end to receive a reflection of the emitted wave.

In yet another exemplary aspect of the present disclosure, a dishwashing appliance is provided. The dishwashing appliance may include a cabinet, a door, and a sensor assembly. The cabinet may extend along a lateral direction between a first side and a second side. The cabinet may define a wash chamber for receipt of articles for washing. The door may extend along a vertical direction between a top end and a bottom end. The door may be rotatably mounted to the cabinet to move between an opened position and a closed position. The sensor assembly may be attached to the cabinet to detect a rotational position of the door. The sensor assembly may include a wave emission sensor mounted to the cabinet below the washing chamber to project an emitted wave, and a wave reception sensor mounted to the cabinet below the washing chamber and spaced apart from the wave emission sensor to receive a reflection of the emitted wave.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
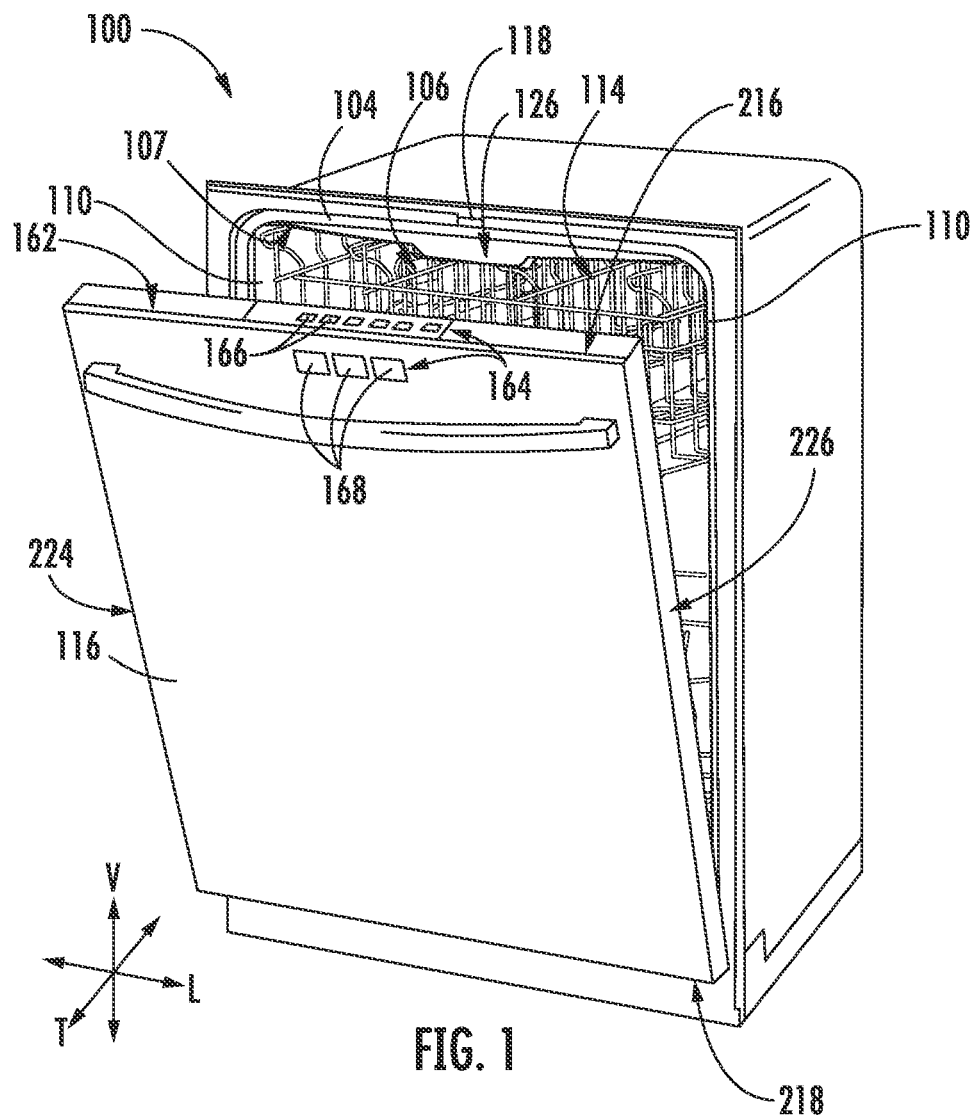
FIG. 1 provides a perspective view of a dishwasher appliance, including a dishwasher door according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

FIGS. 1 through 5 depict an exemplary domestic dishwasher or dishwashing appliance 100 that may be configured in accordance with aspects of the present disclosure. For the particular embodiment of FIGS. 1 through 5, the dishwasher 100 includes a cabinet 102 that is generally configured for containing or supporting various components of appliance 100 and which may also define one or more internal chambers (e.g., wash chamber 106) or compartments of appliance 100. For instance, cabinet 102 may have or include a tub 104 that defines a wash chamber 106 therein. As used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, insulation material(s), or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

As shown, tub 104 extends between a top 107 and a bottom 108 along a vertical direction V, between a pair of sides or sidewalls 110 along a lateral direction L, and between a front side 111 and a rear side 112 along a transverse direction T. Each of the vertical direction V, lateral direction L, and transverse direction T are mutually orthogonal to one another.

The tub 104 includes a front opening 114 and a door 116 hinged at its bottom for movement between a normally closed (e.g., vertical) position (e.g., FIGS. 2 and 3A), wherein the wash chamber 106 is sealed shut for washing operation, and a fully opened (e.g., horizontal) position (e.g., FIG. 3C) for loading and unloading of articles from the dishwasher 100. In the normally closed position, door 116 extends from a top end 216 to a bottom end 218 along the vertical direction V; from a front end 220 to a rear end 222 along the transverse direction T; and between two lateral edges or ends 224, 226 along the lateral direction L. A rotation axis 228 may be defined on the door 214 (e.g., by one or more lateral pivot hinges or pins), for example, parallel to the lateral direction L at or proximal to bottom end 218. According to exemplary embodiments, dishwasher 100 further includes a door closure mechanism or assembly 118 that is used to lock and unlock door 116 for accessing and sealing wash chamber 106.

Figure 2:
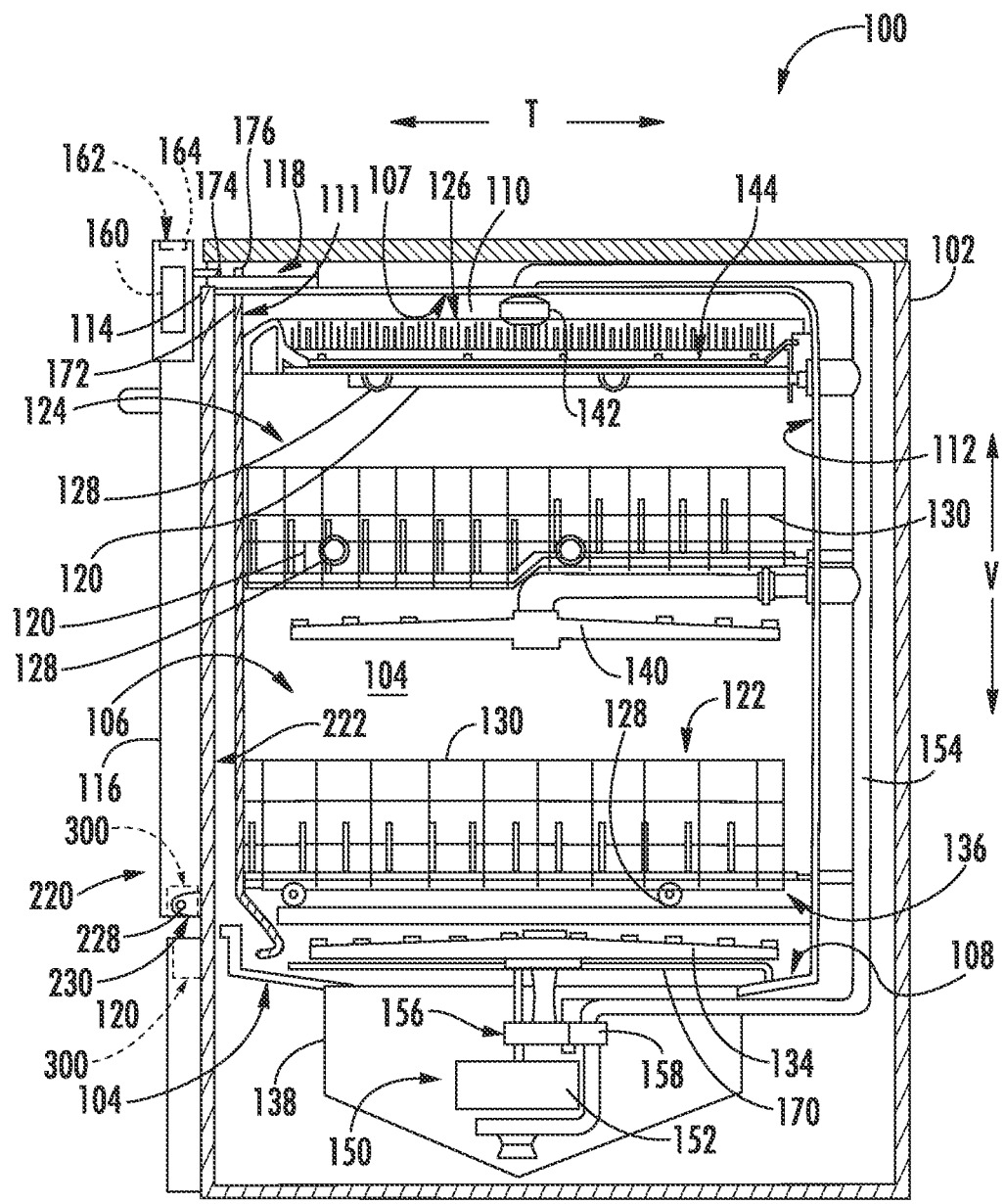
FIG. 2 provides a side cross-sectional view of the exemplary dishwashing appliance of FIG. 1.
Figure 3A:
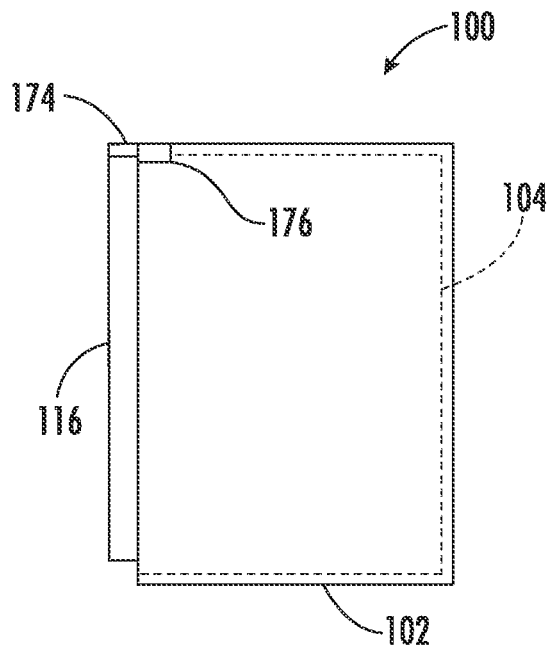
FIG. 3A provides a schematic elevation view of the exemplary dishwashing appliance of FIG. 1, wherein the door is in a closed position.
Figure 3B:
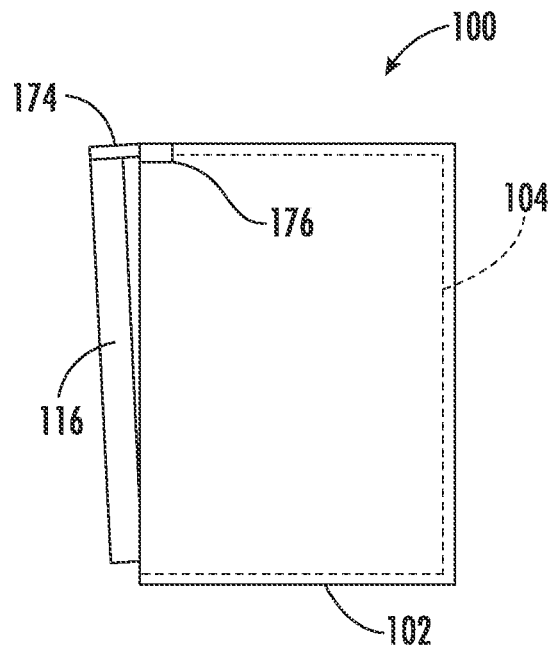
FIG. 3B provides a schematic elevation view of the exemplary dishwashing appliance of FIG. 1, wherein the door is in an intermediate position.
Figure 3C:
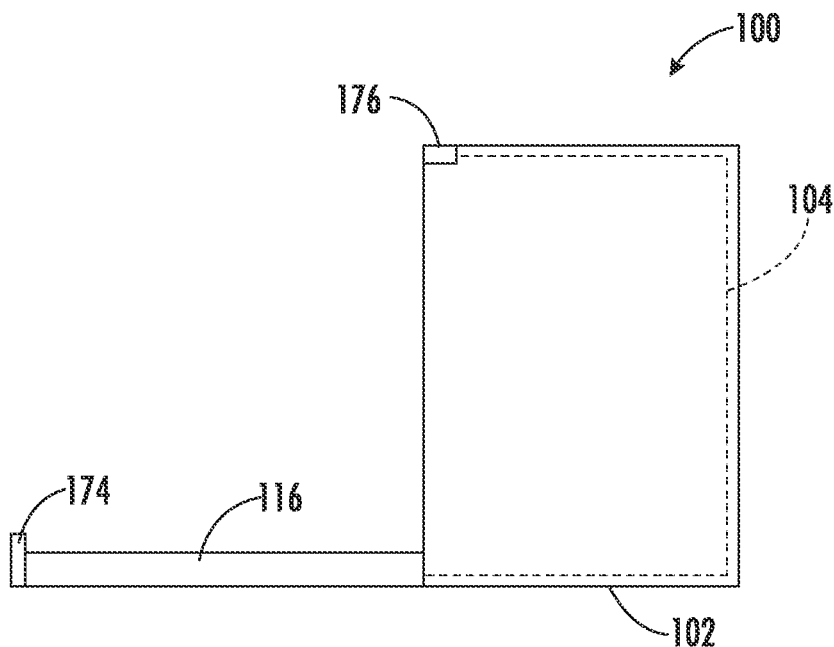
FIG. 3C provides a schematic elevation view of the exemplary dishwashing appliance of FIG. 1, wherein the door is in an opened position.

As illustrated in FIG. 2, tub sidewalls 110 may accommodate a plurality of rack assemblies. For instance, guide rails 120 may be mounted to sidewalls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although a guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 may be fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles (e.g., during a cleaning or rinsing cycle). According to another exemplary embodiment, a silverware basket (not shown) may be removably attached to a rack assembly (e.g., lower rack assembly 122) for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water or wash fluid (e.g., detergent, water, or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply wash fluid to one or more spray assemblies (e.g., to mid-level spray arm assembly 140 and upper spray assembly 142). However, it should be appreciated that according to alternative embodiments, any other suitable plumbing configuration may be used to supply wash fluid throughout the various spray manifolds and assemblies described herein. For example, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156 (e.g., which may be positioned within sump 138 of dishwasher appliance 100). Diverter assembly 156 may include a diverter disk (not shown) disposed within a diverter chamber 158 for selectively distributing the wash fluid to the spray arm assemblies 134, 140, 142 or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter assembly 156 is configured for selectively distributing the flow of wash fluid from pump 152 to various fluid supply conduits, only some of which are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level or upper spray assemblies 140, 142 (e.g., such as primary supply conduit 154).

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In some embodiments, the processor executes programming instructions stored in memory. For certain embodiments, the instructions include a software package configured to operate appliance 100, such as according to one or more programmed cycles methods (e.g., 600 and 700 described below). The memory may be a separate component from the processor or may be included onboard within the processor. Alternatively, controller 160 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116, as shown in FIGS. 1 and 2. In such an embodiment, input/output ("I/O") signals may be routed between the control system and various operational components of dishwasher 100 along wiring harnesses that may be routed, for example, through the bottom of door 116. Typically, the controller 160 includes a user interface panel or control panel 164 through which a user may select various operational features and modes and monitor progress of the dishwasher 100. In one embodiment, the user interface 164 may represent a general purpose I/O ("GPIO") device or functional block. In certain embodiments, the user interface 164 includes input components 166, such as one or more of a variety of electrical, mechanical or electro-mechanical input devices including rotary dials, push buttons, and touch pads (e.g., resistive or capacitive touch screen). As shown, one or more user inputs 166 (e.g., resistive or capacitive touch buttons) of user interface 164 may be positioned at a top end 216 of door 116 (e.g., on or through a top wall of door 116). The user interface 164 may further include one or more display components 168, such as a digital display device or one or more indicator light assemblies designed to provide operational feedback to a user. The user interface 164 may be in communication with the controller 160 via one or more signal lines or shared communication busses.

In some embodiments, a heating element 170 is operably coupled (e.g., electrically coupled) to the controller 160 to selectively provide heat to the wash chamber 106 (e.g., during a dry cycle). For example, heating element 170 may be provided as a resistive or sheathed heating element 170 (e.g., CALROD®) mounted to a bottom portion of tub 104. In some such embodiments, heating element 170 is attached to a bottom wall 108 within the sump 138 or wash chamber 106. Nonetheless, heating element 170 may include or be provided any suitable heater for heating wash chamber 106 (e.g., to dry articles therein), as is generally understood. During use, the controller 160 may thus transmit one or more heating signals (e.g., as an electrical current) in order to activate heating element 170 and initiate the generation of heat therefrom.

It should be appreciated that the present disclosure is not limited to any particular style, model, or configuration of dishwasher 100. The exemplary embodiment depicted in FIGS. 1 through 5 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present disclosure.

As noted above, a latch assembly 118 is included in some embodiments. Generally, latch assembly 118 may serve to selectively hold door 116 closed and may include a separate latch 174 (e.g., proximal to or mounted at a top portion of door 116) and catch 176 (e.g., disposed at or above top 107). As shown, latch 174 may generally extend rearward, such as from an inner or rearward-facing surface of door 116 and toward the cabinet 102. When closed or otherwise in the in the closed position (e.g., fully closed position—FIG. 2), latch 174 may be received within a cavity or catch 176 of cabinet 102 (e.g., such that latch is locked within cabinet 102).

In certain embodiments, door latch 118 includes a lock actuator or motor 172 to selectively move or motivate door 116, such as between the closed position and an open (e.g., partially open) position. For instance, lock motor 172 may be in selective mechanical communication with a latch 174 or another suitable portion of door 116 (e.g., proximal to a top portion thereof). Moreover, lock motor 172 may engage latch 174 such that lock motor 172 is able to motivate (e.g., push or pull) latch 174, and thus door 116, forward/rearward relative to a top portion of tub 104 or cabinet 102.

In some embodiments, latch assembly 118 is in operative (e.g., electrical or wireless) communication with controller 160. Controller 160 may be configured to detect door 116 in the closed position, such as through an include mechanical or electrical (e.g., magnetic) reed switch that transmits a closed door 116 signal (e.g., to controller 160) in response to engagement therewith by the door 116. In some such embodiments, closure assembly 118 includes a first contact mounted to tub 104 and a second contact mounted to door 116 (e.g., to rotate therewith). For instance, the first contact may provide a rail or catch (e.g., catch 176) that receives or contacts the second contact (e.g., latch 174) when door 116 is in the closed position or a partially open (e.g., vent) position.

In optional embodiments, lock motor 172 may be in operative (e.g., electrical or wireless) communication with controller 160. Moreover, lock motor 172 may include any suitable motor or actuator for translating or pivoting the door 116 (e.g., as directed by controller 160). Thus, controller 160 may be configured to direct door 116 between, for example, the closed position and the partially open (e.g., vent) position.

Turning now to FIGS. 2 through 5, separate from or in addition to latch assembly 118, a sensor assembly 300 is attached to cabinet 102 (e.g., directly or, alternatively, indirectly) and can, thus, move therewith. In particular, sensor assembly 300 is provided on or in communication with door 116. Generally, sensor assembly 300 may be configured to detect one or more rotational positions (e.g., predetermined positional angles) of door 116. Specifically, sensor assembly 300 may be configured to detect the positional angle of door about its rotation axis 228. Optionally, sensor assembly 300 may detect one or more predetermined positions (e.g., positional angles) of door 116. For instance, sensor assembly 300 may be in communication (e.g., electric or wireless communication) with controller 160 to generate one or more signals indicating the positional angle that door 116 is currently in or has recently reached. Sensor assembly 300 may thus detect or determine if door 116 is in the closed position (e.g., FIG. 3A), fully opened position (e.g., FIG. 3C), or one or more intermediate positions (e.g., a partially opened position—FIG. 3B) between the closed position and the fully opened position.

As shown, sensor assembly 300 includes a discrete wave emission sensor 310 and wave reception sensor 312. Each of wave emission sensor 310 and wave reception sensor 312 is spaced apart from the other (e.g., along the lateral direction L, the vertical direction V, or the transverse direction T).

Generally, the sensors 310, 312 are provided as electromagnetic sensors, such as infrared (IR) or ultrasonic sensors. Thus, one or more emitted waves (e.g., IR or ultrasonic waves) may be projected from or received by the sensors 310, 312. As an example, the wave emission sensor 310 may include an infrared (IR) emission sensor while the wave reception sensor 312 comprises an IR reception sensor. Adjacent components or objects (e.g., within a line of sight of the sensors 310, 312) may cause IR emissions from the IR emission sensor to be reflected toward, and received by, the IR reception sensor. As an alternative example, the wave emission sensor 310 may include an ultrasonic emission sensor while the wave reception sensor 312 comprises an ultrasonic reception sensor. Adjacent components (e.g., within a line of sight of the sensors 310, 312) may cause ultrasonic emissions from the ultrasonic emission sensor to be reflected toward, and received by, the ultrasonic reception sensor.

In some embodiments, sensor assembly 300 is directed at (e.g., has a line of sight projected to) a rotational path P of the door 116, such as at the bottom end 218, which the door 116 may selectively move along or occupy as it moves between the fully opened position and the fully closed position. Thus, at least a portion of the door 116 may fall within the line of sight of sensor assembly 300 at one or more positional angles of the door 116 between the fully opened and closed positions.

Figure 4:
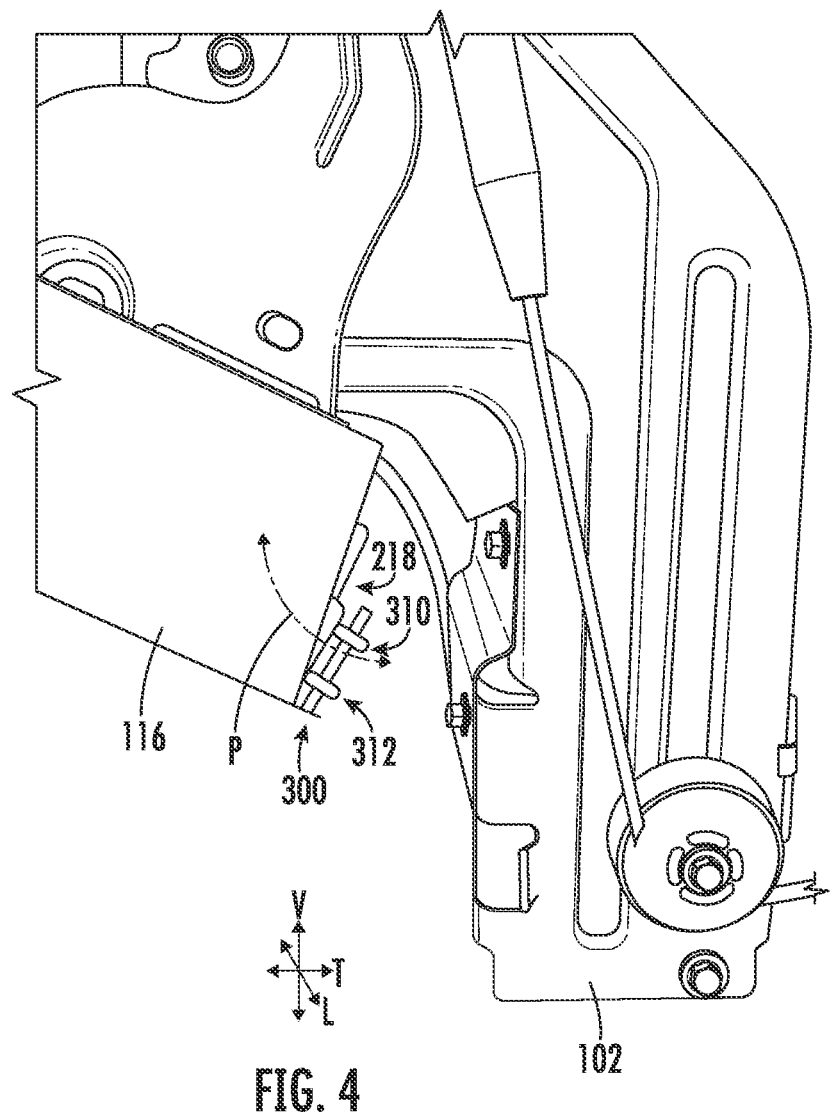
FIG. 4 provides a perspective view of a bottom portion of dishwashing appliance and sensor assembly according to exemplary embodiments of the present disclosure.

As an example, and as illustrated in FIG. 4, the wave emission sensor 310 may be mounted to the door 116 at the bottom end 218. Wave emission sensor 310 may be directed downward (e.g., in the closed position of the door 116). Thus, when door 116 is in the closed position, the emitted wave(s) projected from the wave emission sensor 310 may project downward (e.g., parallel to the vertical direction V) toward the ground. Moreover, as the door 116 rotates to the fully opened position, the direction of wave emission sensor 310 may similarly rotate (e.g., toward the cabinet 102). When door 116 is in the fully opened position, wave emission sensor 310 may be directed horizontally, such as toward a front portion or kickplate of cabinet 102.

Separate from or in addition to the wave emission sensor 310, the wave reception sensor 312 may be mounted to the door 116 at the bottom end 218. In some such embodiments, wave reception sensor 312 and wave emission sensor 310 move together (e.g., with door 116) and, thus, remain fixed relative to each other even as door 116 rotates relative to cabinet 102. As noted above, wave reception sensor 312 may be spaced apart from wave reception sensor 312. For instance, wave reception sensor 312 may be spaced apart from the wave reception sensor 312 along the lateral direction L. Optionally, wave reception sensor 312 may be transversely aligned (e.g., disposed at a common transverse location) with wave emission sensor 310. Additionally or alternatively, wave reception sensor 312 may be vertically aligned (e.g., disposed at the same vertical height) with wave emission sensor 310 (e.g., in the closed position).

Figure 5:
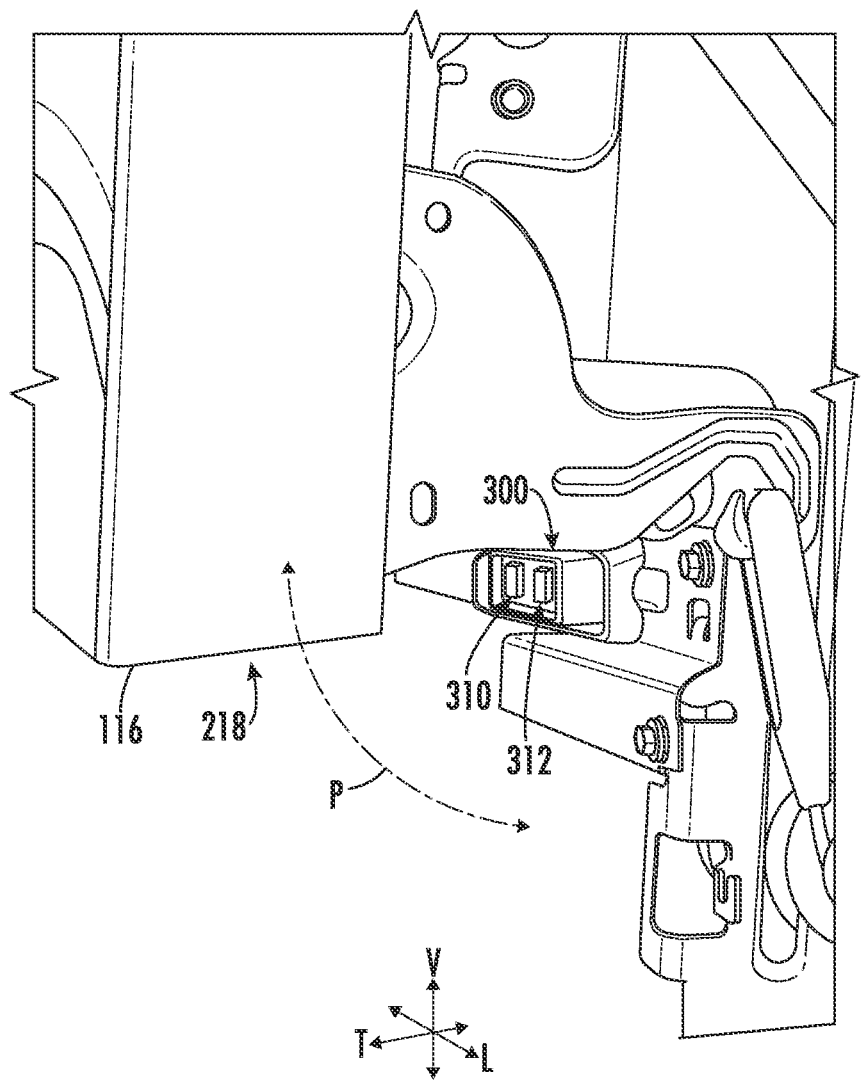
FIG. 5 provides a perspective view of a bottom portion of dishwashing appliance and sensor assembly according to other exemplary embodiments of the present disclosure.

As an additional or alternative example, and as illustrated in FIG. 5, the wave emission sensor 310 may be mounted to the cabinet 102 (e.g., below the wash chamber 106—FIG. 2). Optionally, wave emission sensor 310 may be mounted below (e.g., at a lower vertical height than) the pivot axis of door 116. Additionally or alternatively, wave emission sensor 310 may be mounted above (e.g., at a higher vertical height than) the bottom end 218 of door 116 (e.g., in the opened position or the closed position). Wave emission sensor 310 may be directed forward (e.g., in the general direction of door 116). Thus, when door 116 is in one or more positional angles, the emitted wave(s) projected from the wave emission sensor 310 may project forward (e.g., parallel to the transverse direction T) toward the door 116. Moreover, as the door 116 rotates to the fully opened position, at least a portion of door 116 may intersect with the line of sight of the wave emission sensor 310.

Separate from or in addition to the wave emission sensor 310, the wave reception sensor 312 may be mounted to the cabinet 102 (e.g., below the wash chamber 106—FIG. 2). In some such embodiments, wave reception sensor 312 and wave emission sensor 310 are both fixed or stationary (e.g., on cabinet 102) and, thus, remain fixed relative to each other even as door 116 rotates relative to cabinet 102. As noted above, wave reception sensor 312 may be spaced apart from wave reception sensor 312. For instance, wave reception sensor 312 may be spaced apart from the wave reception sensor 312 along the lateral direction L. Optionally, wave reception sensor 312 may be transversely aligned (e.g., disposed at a common transverse location) with wave emission sensor 310. Additionally or alternatively, wave reception sensor 312 may be vertically aligned (e.g., disposed at the same vertical height) with wave emission sensor 310.

Returning generally to FIGS. 2 through 5, as described above, controller 160 may be attached to the cabinet 102 (e.g., directly or indirectly, such as via door 116) in operative communication with sensor assembly 300. Separately or together, controller 160 and sensor assembly 300 may be configured to determine the positional angle of door 116 (e.g., generally, or at one or more predetermined intermediate positions). During use (e.g., as part of an appliance operation), the wave emission sensor 310 projects an emitted (e.g., IR or ultrasonic) wave that reflects off of one or more objects within the line of sight of wave emission sensor 310. The emitted wave may then be reflected by an adjacent object and received by the wave reception sensor 312. In turn, the wave reception sensor 312 may direct a position signal (e.g., to the control) that corresponds to reception of the emitted wave. Thus, the time taken for the emitted wave to be projected, reflected, and received may be measured. Subsequently, the controller 160 may calculate the flight distance traveled by the emitted wave along or may use an empirically derived function to generate the positional angle of the door 116 based on the flight distance of the emitted wave, as would be understood in light of the present disclosure.

It is noted that although sensor assembly 300 may be configured to detect one or more predetermined positions (e.g., at one or more set positional angles), other positions may be detected by separate assemblies. As an example, in optional embodiments, the fully closed position is detected by the latch assembly 118 (FIG. 2), as described above.

In some embodiments, controller 160 is configured to direct or alter operation of the dishwashing appliance based on the position signal received from the sensor assembly 300 (e.g., the detection of door 116 in one or more predetermined positions). As an example, controller 160 may limit activation of the control panel 164 based on the determined positional angle of the door 116. For example, a set threshold or range of angle values may be provided (e.g., greater than 30° or 45° relative to the vertical direction V). Opening of the door 116 past the set threshold or range of angle values may prompt the controller 160 to hold the control panel 164 in an inactive state (e.g., to prevent any input signals from the control panel 164 to the controller 160). Such an inactive state may be maintained, for instance, until the door 116 closes or otherwise falls below the set threshold or range of angle values. In turn, the controller 160 may advantageously preventing accidental user engagement.

Additionally or alternatively, the controller 160 may determine the door 116 is in a fully opened position. In response to such a determination, controller 160 may deactivate the user interface 164 (e.g., advantageously preventing accidental user engagement).

Further additionally or alternatively, in response to the determination that the door is in the fully opened position, the controller 160 may prompt detection of an additive level for additive within one or more additive compartments within the door 116 (e.g., advantageously ensuring accurate detection of the amount or volume of received additive). Further additional or alternative embodiments may influence operation based on detection (or absence thereof) of the door 116 in one or more predetermined positions, as would be understood in light of the present disclosure.

Advantageously, appliances or assemblies in accordance with the above-described embodiments may reliably detect one or more rotational positions of the door 116 (e.g., in a position beyond just fully closed). Moreover, such embodiments may detect rotational positions without the need for relative expensive or complex sensors, such as a Hall effect sensor, gyroscope, or accelerometer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance defining a vertical direction, a lateral direction, and a transverse direction, the dishwashing appliance comprising:
   a cabinet extending along the lateral direction between a first side and a second side, the cabinet defining a wash chamber for receipt of articles for washing;
   a door extending along the vertical direction between a top end and a bottom end, the door being rotatably mounted to the cabinet to move along a rotation path between an opened position and a closed position; and
   a sensor assembly attached to the cabinet to detect a positional angle of the door, the sensor assembly comprising
      a wave emission sensor directed at the rotation path to project an emitted wave, and
      a wave reception sensor spaced apart from the wave emission sensor to receive a reflection of the emitted wave.

2. The dishwashing appliance of claim 1, wherein the wave emission sensor comprises an infrared (IR) emission sensor, and wherein the wave reception sensor comprises an IR reception sensor.

3. The dishwashing appliance of claim 1, wherein the wave emission sensor comprises an ultrasonic emission sensor, and wherein the wave reception sensor comprises an ultrasonic reception sensor.

4. The dishwashing appliance of claim 1, wherein the wave reception sensor is spaced apart from the wave emission sensor along the lateral direction.

5. The dishwashing appliance of claim 1, wherein the wave emission sensor is mounted to the door and directed downward in the closed position, and wherein the wave reception sensor is mounted to the door and directed downward in the closed position.

6. The dishwashing appliance of claim 1, wherein the wave emission sensor is mounted to the cabinet and directed forward toward the rotation path, and wherein the wave reception sensor is mounted to the cabinet and directed forward toward the rotation path.

7. The dishwashing appliance of claim 1, further comprising a controller attached to the cabinet, wherein the controller is configured to direct an appliance operation comprising;
   receiving a position signal corresponding to reception of the emitted wave, and
   determining the positional angle of the door based on the position signal.

8. The dishwashing appliance of claim 7, wherein the dishwashing appliance further comprises a control panel mounted to the door, and wherein the appliance operation further comprises limiting activation of the control panel based on the determined positional angle of the door.

9. A dishwashing appliance defining a vertical direction, a lateral direction, and a transverse direction, the dishwashing appliance comprising:
   a cabinet extending along the lateral direction between a first side and a second side, the cabinet defining a wash chamber for receipt of articles for washing;
   a door extending along the vertical direction between a top end and a bottom end, the door being rotatably mounted to the cabinet to move between an opened position and a closed position; and
   a sensor assembly attached to the cabinet to detect a rotational position of the door, the sensor assembly comprising
      a wave emission sensor mounted to the door at the bottom end to project an emitted wave therefrom, and
      a wave reception sensor mounted to the door at the bottom end to receive a reflection of the emitted wave.

10. The dishwashing appliance of claim 9, wherein the wave reception sensor is spaced apart from the wave emission sensor along the transverse direction.

11. The dishwashing appliance of claim 9, wherein the wave emission sensor comprises an infrared (IR) emission sensor, and wherein the wave reception sensor comprises an IR reception sensor.

12. The dishwashing appliance of claim 9, wherein the wave emission sensor comprises an ultrasonic emission sensor, and wherein the wave reception sensor comprises an ultrasonic reception sensor.

13. The dishwashing appliance of claim 9, further comprising a controller attached to the cabinet, wherein the controller is configured to direct an appliance operation comprising;
   receiving a position signal corresponding to reception of the emitted wave, and
   determining a positional angle of the door based on the position signal.

14. The dishwashing appliance of claim 13, wherein the dishwashing appliance further comprises a control panel mounted to the door, and wherein the appliance operation further comprises limiting activation of the control panel based on the determined positional angle of the door.

15. A dishwashing appliance defining a vertical direction, a lateral direction, and a transverse direction, the dishwashing appliance comprising:
- a cabinet extending along the lateral direction between a first side and a second side, the cabinet defining a wash chamber for receipt of articles for washing;
- a door extending along the vertical direction between a top end and a bottom end, the door being rotatably mounted to the cabinet to move between an opened position and a closed position; and
- a sensor assembly attached to the cabinet to detect a rotational position of the door, the sensor assembly comprising
  - a wave emission sensor mounted to the cabinet below the washing chamber to project an emitted wave, and
  - a wave reception sensor mounted to the cabinet below the washing chamber and spaced apart from the wave emission sensor to receive a reflection of the emitted wave.

16. The dishwashing appliance of claim 15, wherein the wave reception sensor is spaced apart from the wave emission sensor along the lateral direction.

17. The dishwashing appliance of claim 15, wherein the wave emission sensor comprises an infrared (IR) emission sensor, and wherein the wave reception sensor comprises an IR reception sensor.

18. The dishwashing appliance of claim 15, wherein the wave emission sensor comprises an ultrasonic emission sensor, and wherein the wave reception sensor comprises an ultrasonic reception sensor.

19. The dishwashing appliance of claim 15, further comprising a controller attached to the cabinet, wherein the controller is configured to direct an appliance operation comprising;
- receiving a position signal corresponding to reception of the emitted wave, and
- determining a positional angle of the door based on the position signal.

20. The dishwashing appliance of claim 19, wherein the dishwashing appliance further comprises a control panel mounted to the door, and wherein the appliance operation further comprises limiting activation of the control panel based on the determined positional angle of the door.

* * * * *